United States Patent
De Wilde

(10) Patent No.: US 6,829,352 B2
(45) Date of Patent: Dec. 7, 2004

(54) AMPLIFIER ARRANGEMENT

(75) Inventor: Wim André Paula De Wilde, Antwerp (BE)

(73) Assignee: Alcatel, Paris (FR)

( * ) Notice: Subject to any disclaimer, the term of this patent is extended or adjusted under 35 U.S.C. 154(b) by 639 days.

(21) Appl. No.: 09/969,788

(22) Filed: Oct. 4, 2001

(65) Prior Publication Data

US 2002/0041675 A1 Apr. 11, 2002

(30) Foreign Application Priority Data

Oct. 5, 2000 (EP) ............................................ 00402752

(51) Int. Cl.⁷ ............................ H04M 1/00; H04M 9/00
(52) U.S. Cl. .................. 379/395; 379/380; 379/388.03; 379/390.01
(58) Field of Search ...................... 379/390.03, 390.04, 379/391, 395, 402, 403, 404

(56) References Cited

U.S. PATENT DOCUMENTS

| | | | |
|---|---|---|---|
| 4,758,822 A | | 7/1988 | Greaby |
| 5,796,818 A | * | 8/1998 | McClennon et al. ... 379/406.06 |
| 6,751,202 B1 | * | 6/2004 | Henrie ..................... 370/286 |
| 6,760,434 B1 | * | 7/2004 | Rezvani et al. ............. 379/402 |

FOREIGN PATENT DOCUMENTS

| | | |
|---|---|---|
| EP | 0 746 117 A2 | 12/1996 |
| EP | 0 901 221 A1 | 3/1999 |
| EP | 0 868 035 A2 | 9/1999 |
| WO | WO 00/51258 | 8/2000 |

* cited by examiner

Primary Examiner—Duc Nguyen
Assistant Examiner—Tuan Pham
(74) Attorney, Agent, or Firm—Sughrue Mion, PLLC

(57) ABSTRACT

Amplifier arrangement comprising:
  a resistive receive hybrid means adapted to pass a combination of a received signal and a transmitted signal,
  a resistive transmit hybrid means adapted to pass substantially only the transmitted signal,
  a tuneable gain means adapted for converting the transmit hybrid signal into a signal corresponding substantially to the reverse of the portion of the receive hybrid signal function of the transmitted signal passing through the receive hybrid means,
  signal treatment means adapted to add or subtract the gained signal to and/or from the receive hybrid signal, whereby said treatment is adapted for generating a signal which is substantially independent of the transmitted signal.

10 Claims, 3 Drawing Sheets

AMPLIFIER ARRANGEMENT

BACKGROUND OF THE INVENTION

The present invention relates to an amplifier arrangement for broadband signal.

It is known to use receivers for broadband communication systems, such as for asynchronous or asymmetric data (digital) subscriber loop (ADSL), or for high velocity data subscriber loop (VDSL), etc. Some of the known receivers provide an adaptive mechanism for reducing echo, such mechanism being for example a tuneable balance impedance on the balance of a classical hybrid as disclosed in IEEE JOURNAL ON SELECTED AREAS IN COMMUNICATIONS, Vol. 9 No. 6, Aug. 1991, WALTER Y. CHEN, JAMES L. DIXON, DAVID L. WARING, "High Bit Rate Digital Subscriber Line Echo Cancellation". Said transformers are expensive and inflexible.

Another example is a straight-forward wheatstone-bridge hybrid where one of the impedances can be tuned, as disclosed in ISSCC99/Sessions 14/paper tp14.4, MICHAEL MOYAL, MARTIN GROEPL, THOMAS BLON, "A 25 kft 768 kb/s CMOS Transceiver for Multiple Bit-Rate DSL".

In the current art adaptive echo-cancelling is never combined with active back termination (EP-A-0.901.221). This reduces the power efficiency. Moreover the "matching path" in the wheatstone-bridge implementation is noisy when high impedant or power consuming when low impedant.

The amplifier arrangement of the invention is an arrangement enabling an efficient reduction of the noise without transformers. Other advantages of amplifier arrangement of the invention will be disclosed when describing a preferred embodiment of the arrangement of the invention.

SUMMARY OF THE INVENTION

The amplifier arrangement for transmitting and receiving a broadband signal of the invention comprises:

a resistive receive hybrid means adapted to pass a receive hybrid signal selected from the group consisting of combinations of a received signal and a transmitted signal, signals function of the received signal and of the transmitted signal, and combinations thereof, a resistive transmit hybrid means that is adapted to pass a transmit hybrid signal corresponding substantially only the transmitted signal or a portion thereof or a function thereof, a tuneable gain means adapted for converting the transmit hybrid signal into a gained transmit hybrid signal corresponding substantially to the reverse of or substantially equal to a portion of the receive hybrid signal corresponding to or function of the transmitted signal passing through the receive hybrid means, and/or for converting the receive hybrid signal into a gained received hybrid signal, the portion of which is function of the transmitted signal corresponding to the reverse of or being substantially equal to the transmit hybrid signal or to a function thereof, signal treatment means adapted to add or subtract the gained transmit hybrid signal to and/or from a signal selected from the group consisting of the receive hybrid signal, a gained receive hybrid signal and/or a function thereof, and/or to add or subtract the gained receive hybrid signal to and/or from a signal selected from the group consisting of the transmit hybrid signal, a gained transmit hybrid signal and/or a function thereof, whereby said treatment is adapted for generating a signal which is substantially independent of the transmitted signal or a function thereof.

Advantageously, the tuneable gain means is adapted for converting the transmit hybrid signal into a gained transmit hybrid signal corresponding substantially to the reverse of or substantially equal to a portion of the receive hybrid signal corresponding to or function of the transmitted signal passing through the receive hybrid means, while the signal treatment means is adapted to add or subtract the gained transmit hybrid signal to and/or from the receive hybrid signal, whereby said treatment is adapted for generating a signal which is substantially independent of the transmitted signal or a function thereof.

Preferably, the resistive transmit hybrid means is adapted to tune said gain so that the gained transmit hybrid signal is substantially reverse to the portion of the transmitted signal passing through the receive hybrid means. In said case, the signal treatment means is advantageously adapted for adding the signal passed by the receive hybrid means and the gained transmit hybrid signal of said transmit hybrid means together. Preferably, the signal treatment means is then a differential inverter amplifier.

According to a detail of an advantageous embodiment, the resistive receive hybrid means comprises four resistors adapted for receiving a first signal function and a second signal function, each signal function comprising a linear combination of a receive signal and a transmit signal, said resistors being adapted for transferring a receive hybrid signal which is function of the difference between the first signal function and the second signal function.

According to still another detail of an advantageous embodiment, the resistive transmit hybrid means comprises four tuneable resistors adapted for receiving a first signal function and a second signal function, each signal function comprising a linear combination of a receive signal and a transmit signal, said resistors being adapted for transferring a transmit hybrid signal function of the difference between a linear combination of the first signal and a linear combination of the second function, whereby one of said linear combinations or said combinations are adapted so that said difference in not function of the receive signal.

The amplifier arrangement of the invention comprises advantageously an automatic gain control means and/or a line driver means for synthesising at least two combinations comprising each a linear combination of a receive signal and a transmit signal.

The invention relates also to the use of an amplifier arrangement of the invention in a broadband communication system, such as ASDL, VSDL, etc.

BRIEF DESCRIPTION OF THE DRAWINGS

Details and characteristics of the invention will appear from the following description in which reference is made to the attached drawings for the description of a preferred embodiment of the amplifier arrangement of the invention.

In said drawings.

DETAILED DESCRIPTION OF THE INVENTION

Figure 1:
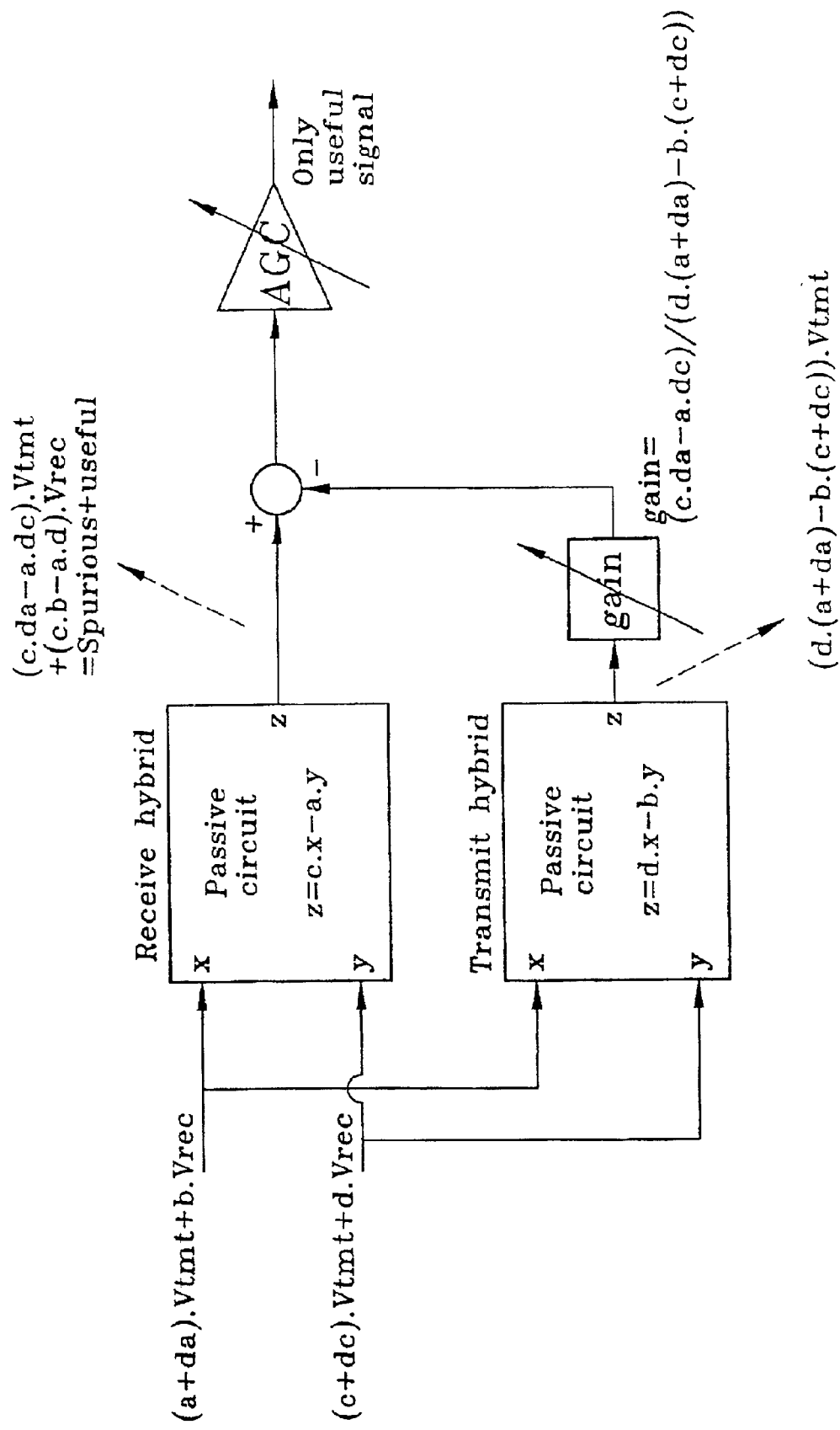
FIG. 1 is a schematic view of a preferred embodiment of the invention.

FIG. 1 is a schematic view of a preferred amplifier arrangement of the invention.

Said amplifier arrangement is adapted for treating two linearly independent combinations of two signals (Vrec or V received or useful signal, Vtmt or V transmitted or noise-spurious signal). The two independent combinations of Vrec and Vtmt are for example IS1 and IS2 as disclosed here below:

$$IS1=(a+da)Vtmt+b\ Vrec$$

$$IS2=(c+dc)Vtmt+d\ Vrec$$

with da and dc: tolerances due to mismatch.

The amplifier arrangement comprises:
- a resistive receive hybrid means (comprising a passive circuit) adapted to pass a receive hybrid signal corresponding to [c IS1–a IS2] or [(c.da–a.dc).Vtmt+(c.b–a.d). Vrec]
- a resistive transmit hybrid means (comprising a passive circuit) adapted to pass a transmit hybrid signal corresponding to [d. IS1–b . IS2] or [(d.(a+da)–b.(c+dc)). Vtmt],
- a tuneable gain means adapted for converting the transmit hybrid signal [(d.(a+da)–b.(c+dc)).Vtmt] into a gained transmit hybrid signal substantially equal to a portion of the receive hybrid signal corresponding to (c.da–a.dc).Vtmt, the gain being equal to [(c.da–a.dc)/(d.(a+da)–b.(c+dc))],
- signal treatment means adapted to add or subtract the gained transmit hybrid signal to the receive hybrid signal, a gained receive hybrid signal and/or a function thereof, whereby said treatment is adapted for generating a signal [(c.b–a.d). Vrec] which is not dependent of the transmitted signal Vtmt.

In the embodiment shown, the gained hybrid transmit signal is reversed (mutiplied by –1) and the reversed gained transmit hybrid signal and the receive hybrid signal are added together using an automatic gain control (AGC). At the output of the AGC, the signal is only a function of Vrec and can possibly be equal to Vrec.

Figure 2:
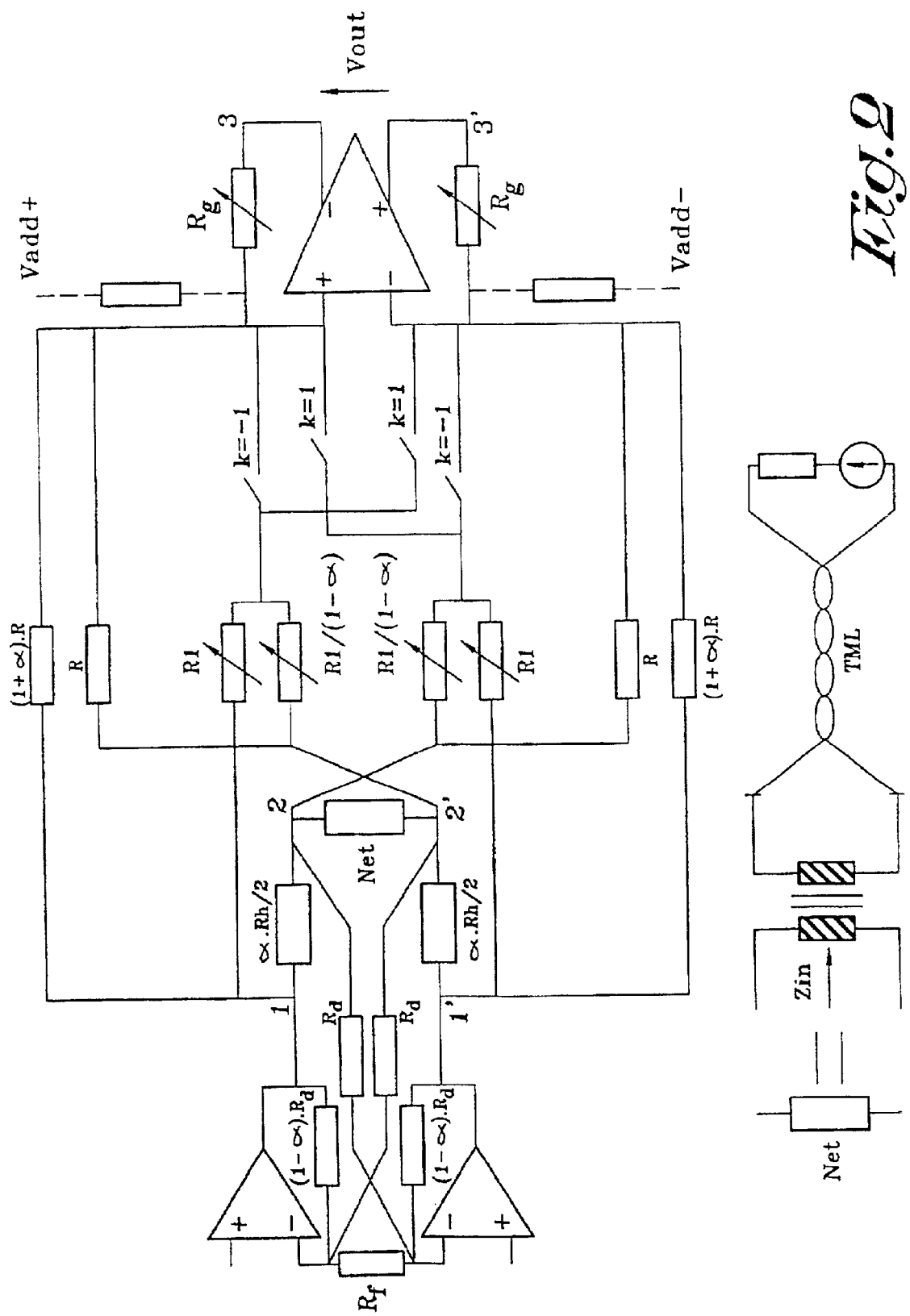
FIG. 2 is a view showing an electrical circuit for carrying the functions shown in FIG. 1.

FIG. 2 is an electrical schematic view of an amplifier arrangement of the invention.

In said figure, reference is made to:

Zin: input impedance

Rh: line termination impedance

R1, R1/(1–α): tuneable resistors of the transmit hybrid

R, (1+α) .R: resistors of the receive hybrid

Rg: tuneable gain resistor

Vadd+/Vadd–: sign control (keeping/inverting) of the transmit hybrid signal

Rd,Rd(1–α),Rf: resistors of the line driver for synthesising a part 1–α of termination impedance Rh α.Rh/2: resistors Net: abreviation of the net as disclosed at the bottom of FIG. 1

Vout: signal output

Vrec and Vtmt are signals present over the nodes 2–2' of the net.

Vtmt is generated by the transceiver depicted at FIG. 2, Vrec is generated by the transceiver at the other side of the line.

If the input impedance Zin does not match the line termination Rh, a current related with Vtmt will be injected in Rg by the receive hybrid. This current is cancelled by injecting the reverse current via the transmit hybrid, by adjusting R1 and the switches.

The amplifier comprises a first receive hybrid comprising the resistors R and (1+α) .R and a second transmit hybrid comprising tuneable resistors R1. The hybrids are mounted in parallel.

The output signal of the receiver (Vout) is equal to:

$$(2\alpha/(1+\alpha)).(Rg/R).[Vrec+[((Zin+Rh)/(Zin-Rh))+(k.(1+\alpha)R/R1)].Vtmt]$$

We note there is a contribution related Vrec. This is the useful signal. There is also a contribution related to the transmitted signal Vtmt. This contribution is called the echo and is useless.

When Zin is exactly equal to Rh, the echo is zero.

Figure 3:
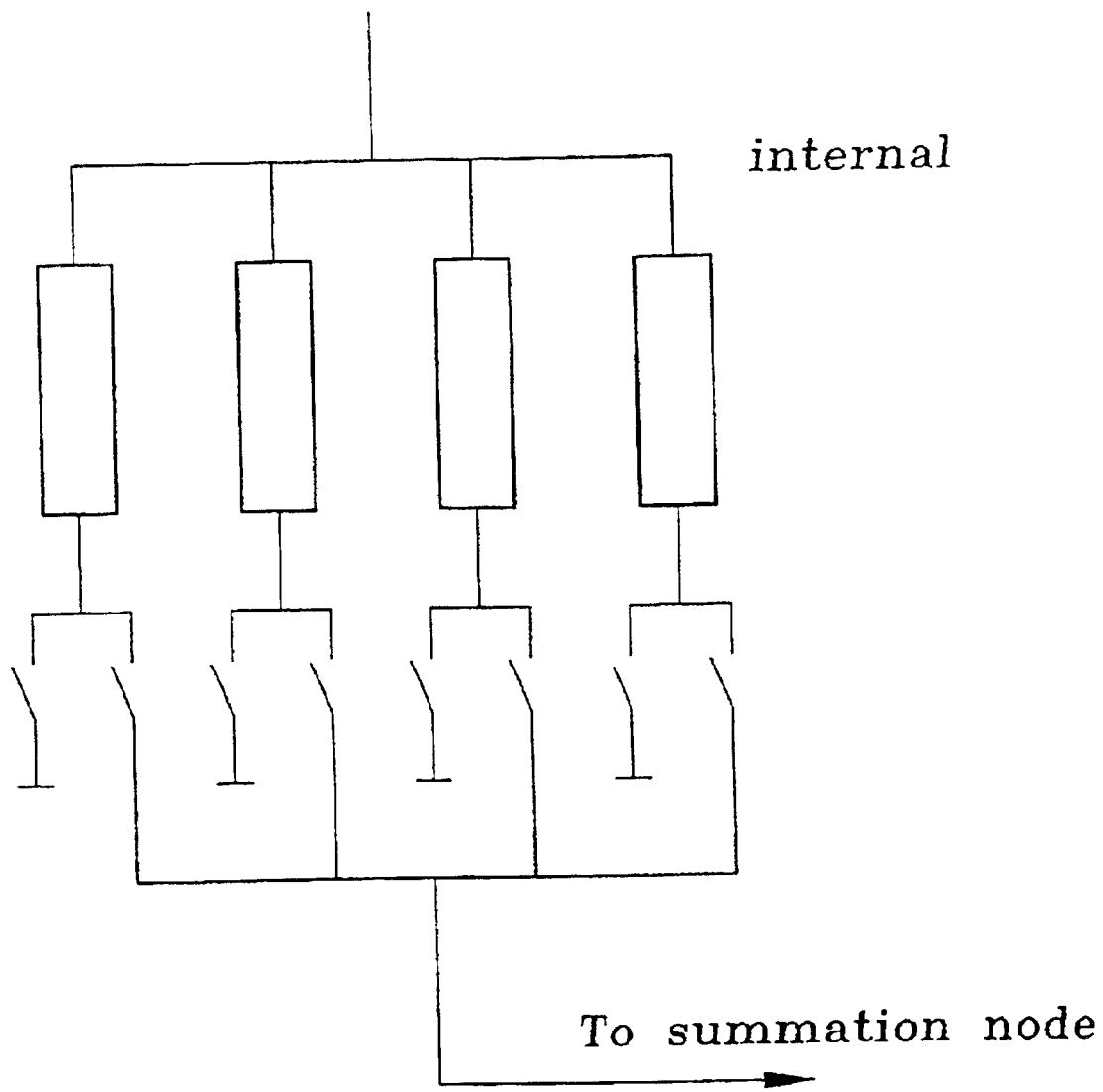
FIG. 3 is a view of a possible implementation of resistance's of the receive hybrid.

When Zin is different from Rh, the presence of echo can be cancelled by tuning R1 and k (1 or –1, by using switches as disclosed in FIG. 3). With said tuning, it is possible to put to equal to zero the factor [((Zin–Rh)/(Zin+Rh))+(k.(1+α) R/R1)].

In the amplifier, R and R1 are such that R>>Rh and R1>>Rh.

The echo cancelling is realised by a hybrid structure of four resistors related to R1 that is adapted to inject a signal at the inputs of the differential receiver DF, that is proportional to the transmitted signal, in order to cancel the echo at the output of the receiver. The hybrid structure of resistors based on R1 passes only transmitted signal or a function thereof in all situations.

In FIG. 3, an implementation of each tuneable resistor R1 is shown. By switching as many resistors as needed to the summation node, the value can be tuned. If a resistor R1 is not used, it is switched to the ground. As the opamp input is virtually at ground and as R1 is a relatively high resistor, the circuit does not suffer from switch distortion. Possible noise due to R1 is not important, as in practice R1 is much higher than R, whereby the parallel equivalent noise source due to R1 is much lower.

By tuning Rg, the circuit combines echo cancellation with automatic gain control (AGC).

Many modifications are possible to the arrangement shown in the attached figures. For example the resistor R1 of the transmit hybrid can be replaced by complex Z1, so as to render possible at least an attenuation, preferably the cancellation of the quadrature part of the echo. It is possible also to add other signal(s) to the amplifier arrangement, for example RFI cancellation signals.

Advantages of the amplifier of FIG. 2 are:
- no transformers required
- very efficient for power dissipation (due to passive and high impedant nature of R1)
- possibility to work with active back terminated driver
- very low noise possible
- no change of the magnitude of the received signal due to the tuning
- full integration possible The amplifier of FIG. 2 is suitable for lowering the echo for VDSL over normal telephone loops. This lowers then the requirements and therefore dissipation, cost, complexity, etc. of all other components in transmit and receive path (such as DAC, ADC, filter, PGA, line driver, etc.) with 5–10 dB.

The amplifier of FIG. 2 enables to increase the performance of a existing modem.

What is claimed is:

1. Amplifier arrangement for transmitting and receiving a broadband signal, said amplifier arrangement comprising:
   a resistive receive hybrid means adapted to pass a receive hybrid signal selected from the group consisting of combinations of a received signal and a transmitted signal, signals function of the received signal and of the transmitted signal, and combinations thereof, a resistive transmit hybrid means that is adapted to pass a transmit hybrid signal corresponding substantially only the transmitted signal or a portion thereof or a function thereof, a tuneable gain means adapted for converting the transmit hybrid signal into a gained transmit hybrid signal corresponding substantially to the reverse of or substantially equal to a portion of the receive hybrid signal corresponding to or function of the transmitted signal passing through the receive hybrid means, and/or for converting the receive hybrid signal into a gained received hybrid signal, the portion of which is function of the transmitted signal corresponding to the reverse of or being substantially equal to the transmit hybrid signal or to a function thereof, signal treatment means adapted to add or subtract the gained transmit hybrid signal to and/or from a signal selected from the group consisting of the receive hybrid signal, a gained receive hybrid signal and/or a function thereof, and/or to add or subtract the gained receive hybrid signal to and/or from a signal selected from the group consisting of the transmit hybrid signal, a gained transmit hybrid signal and/or a function thereof, whereby said treatment is adapted for generating a signal which is substantially independent of the transmitted signal or a function thereof.

2. The amplifier arrangement of claim 1, characterised in that the tuneable gain means is adapted for converting the transmit hybrid signal into a gained transmit hybrid signal corresponding substantially to the reverse of or substantially equal to a portion of the receive hybrid signal corresponding to or function of the transmitted signal passing through the receive hybrid means, while the signal treatment means is adapted to add or subtract the gained transmit hybrid signal to and/or from the receive hybrid signal, whereby said treatment is adapted for generating a signal which is substantially independent of the transmitted signal or a function thereof.

3. The amplifier arrangement of claim 1, characterised in that the resistive transmit hybrid means is adapted to tune said gain so that the gained transmit hybrid signal is substantially reverse to the portion of the transmitted signal passing through the receive hybrid means.

4. The amplifier arrangement of claim 3, characterised in that the signal treatment means is adapted for adding the signal passed by the receive hybrid means and the gained transmit hybrid signal of said transmit hybrid means together.

5. The amplifier arrangement of claim 4, characterised in that the signal treatment means is a differential inverter amplifier.

6. The amplifier arrangement of claim 1, characterised in that the resistive receive hybrid means comprises four resistors adapted for receiving a first signal function and a second signal function, each signal function comprising a linear combination of a receive signal and a transmit signal, said resistors being adapted for transferring a receive hybrid signal which is function of the difference between the first signal function and the second signal function.

7. The amplifier arrangement of claim 1 characterised in that the resistive transmit hybrid means comprises four tuneable resistors adapted for receiving a first signal function and a second signal function, each signal function comprising a linear combination of a receive signal and a transmit signal, said resistors being adapted for transferring a transmit hybrid signal function of the difference between a linear combination of the first signal and a linear combination of the second function, whereby one of said linear combinations or said combinations are adapted so that said difference in not function of the receive signal.

8. The amplifier arrangement of claim 1, characterised in that it comprises an automatic gain control means.

9. The amplifier arrangement of claim 1, characterised in that it comprises a line driver means for synthesising at least two combinations comprising each a linear combination of a receive signal and a transmit signal.

10. Use of an amplifier arrangement of claim 1 in a broadband communication system.

* * * * *